March 27, 1962     B. S. RUMPTZ     3,027,194
HEADREST ASSEMBLY FOR VEHICLE SEATS Filed Aug. 3, 1959     4 Sheets-Sheet 1

INVENTOR.
BERNARD S. RUMPTZ
BY
Barnes, Kisselle, Raisch & Choate
ATTORNEYS

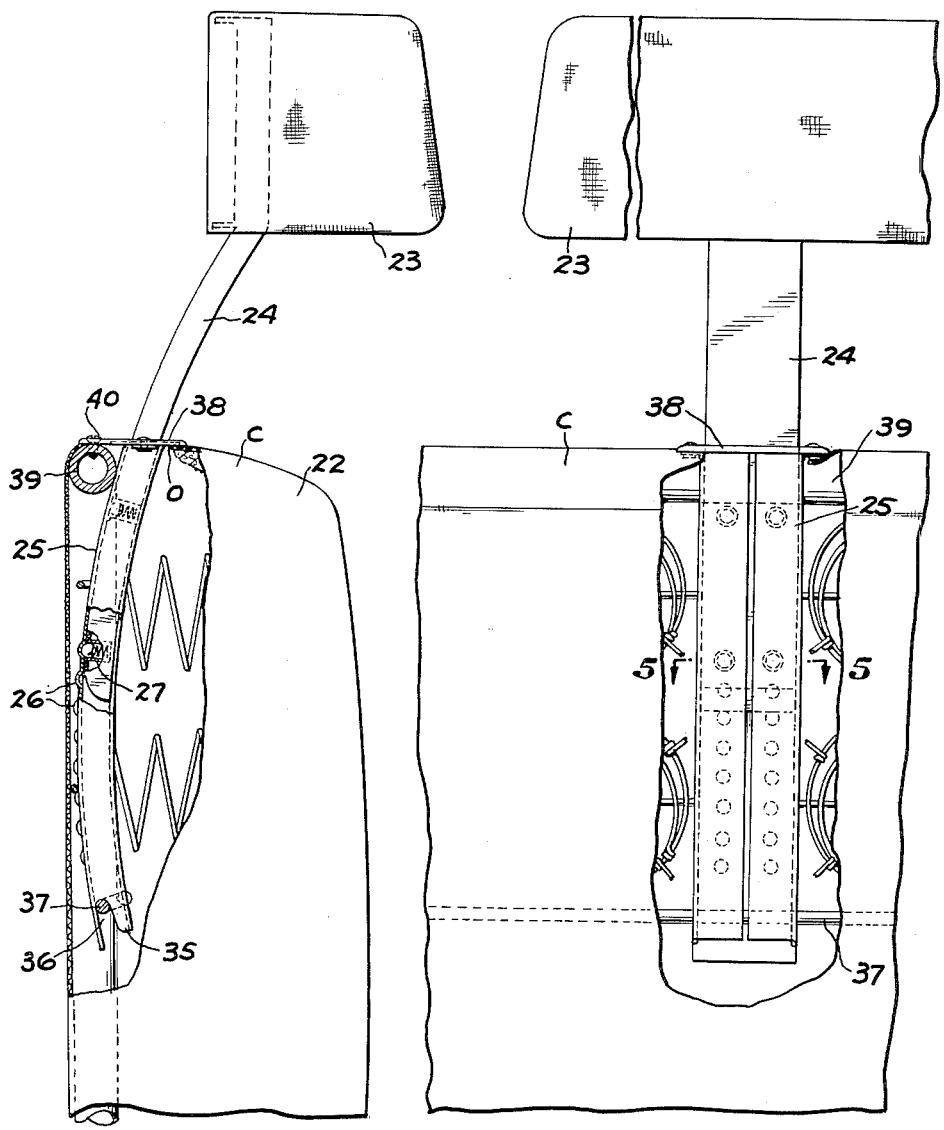
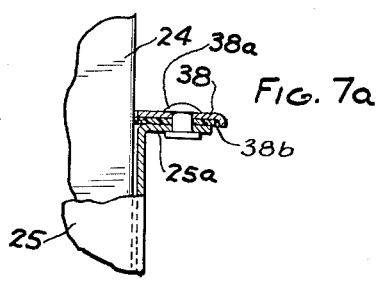
FIG. 6
FIG. 7
FIG. 7a
INVENTOR.
BERNARD S. RUMPTZ
BY
Barnes, Kisselle, Raisch & Choate
ATTORNEYS March 27, 1962   B. S. RUMPTZ   3,027,194
HEADREST ASSEMBLY FOR VEHICLE SEATS
Filed Aug. 3, 1959   4 Sheets-Sheet 3
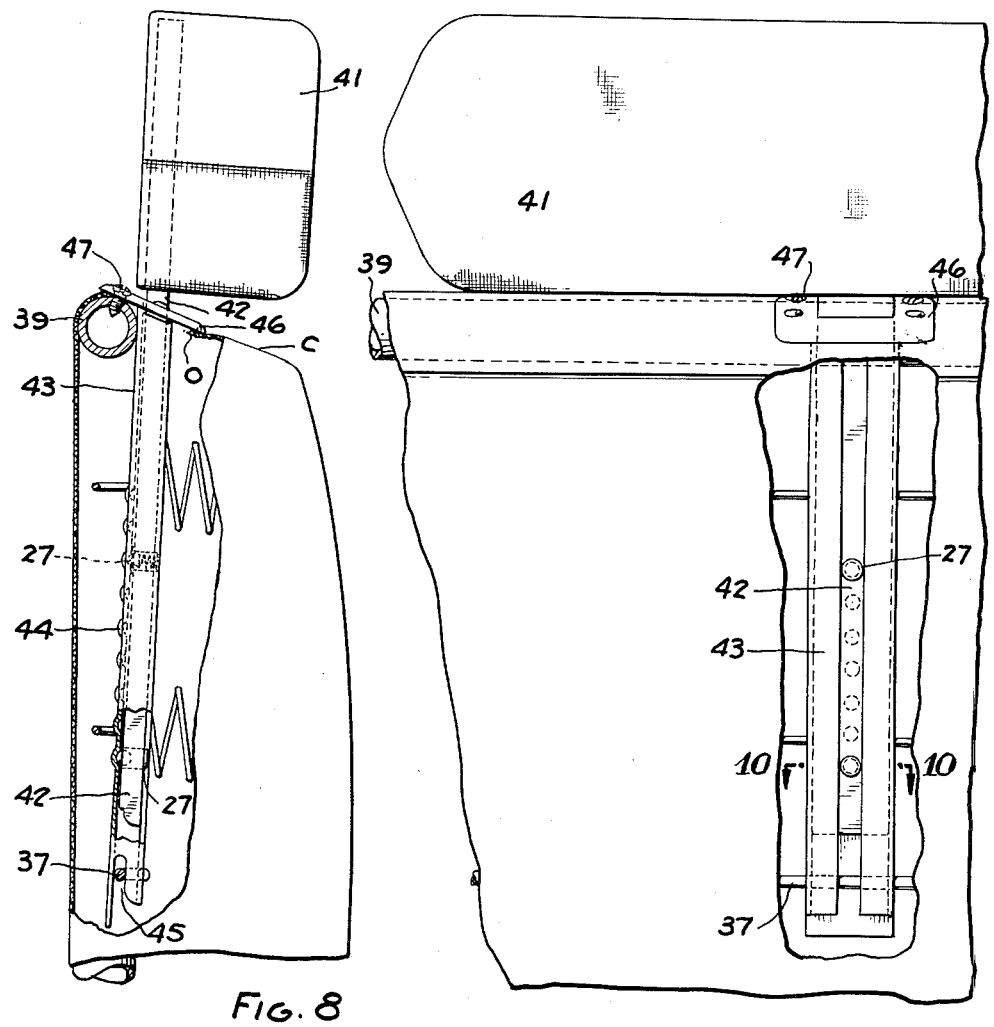
FIG. 8
FIG. 9
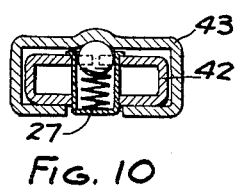
FIG. 10
INVENTOR.
BERNARD S. RUMPTZ
BY
Barnes, Kisselle, Raisch & Choate
ATTORNEYS March 27, 1962   B. S. RUMPTZ   3,027,194
HEADREST ASSEMBLY FOR VEHICLE SEATS
Filed Aug. 3, 1959   4 Sheets-Sheet 4
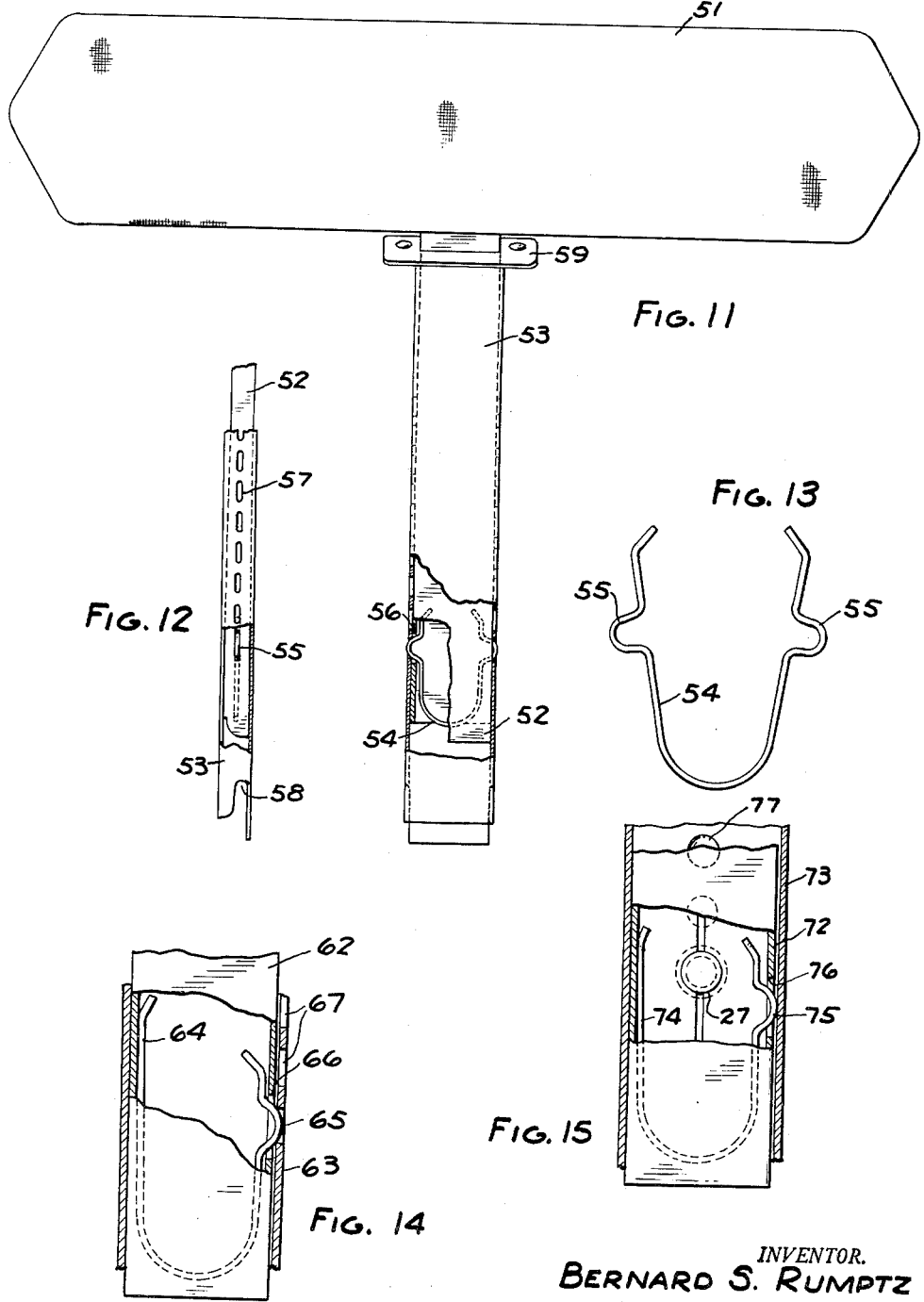
INVENTOR.
BERNARD S. RUMPTZ
BY
Barnes, Kisselle, Raisch & Choate
ATTORNEYS

United States Patent Office 3,027,194
Patented Mar. 27, 1962

3,027,194
HEADREST ASSEMBLY FOR VEHICLE SEATS
Bernard S. Rumptz, Lathrop Village, Mich., assignor to Young Spring & Wire Corporation, Detroit, Mich., a corporation of Michigan
Filed Aug. 3, 1959, Ser. No. 831,283
16 Claims. (Cl. 297—410)

This invention relates to a head rest and particularly to a head rest for vehicle seats.

In vehicles, especially automobiles, it is desirable to provide a head rest not only for the comfort of the driver or passenger but, in addition, as a safety device to prevent injury in case of an accident which tends to jerk a person's head suddenly backwards.

It is an object of this invention to provide a head rest for the back cushion of a vehicle seat which can be easily adjusted vertically to accommodate persons of various heights; which can be manufactured at low cost; which can be applied to a vehicle seat after it has been upholstered; and which can be readily removed when desired without affecting the appearance of the seat back cushion.

In the drawings:

FIG. 6 is a fragmentary side elevation, partly in section, of the seat shown in FIG. 1 on an enlarged scale.

FIG. 7 is a fragmentary front elevation of the seat shown in FIG. 6, parts being broken away.

FIG. 7a is a fragmentary view of a portion of the seat shown in FIG. 7.

FIG. 8 is a fragmentary side elevation, partly in section, of a modified form of the invention.

FIG. 9 is a fragmentary front elevation of the form of invention shown in FIG. 8, parts being broken away.

FIG. 10 is a sectional view taken along the line 10—10 in FIG. 9.

FIG. 11 is a front elevation of a modified form of head rest assembly prior to its being installed on the seat.

FIG. 12 is a fragmentary side elevation, partly in section, of the head rest assembly shown in FIG. 11.

FIG. 13 is an elevation of a spring detent unit used in the head rest assembly shown in FIGS. 11 and 12.

FIG. 14 is a fragmentary front elevation, partly in section, of another modified form of head rest assembly.

FIG. 15 is a fragmentary front elevation, partly in section, of another modified form of head rest assembly.

Figure 1:
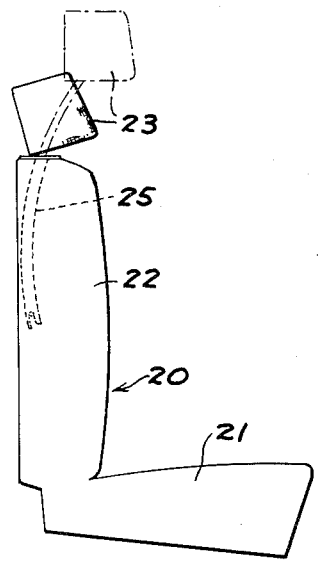
FIG. 1 is a side elevation of a seat embodying the invention.
Figure 2:
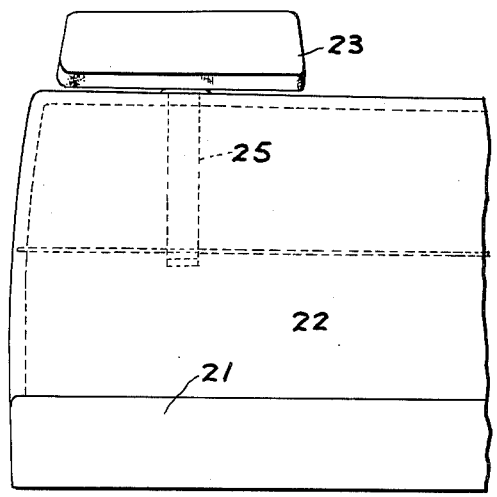
FIG. 2 is a fragmentary front elevation of the seat shown in FIG. 1.
Figure 3:
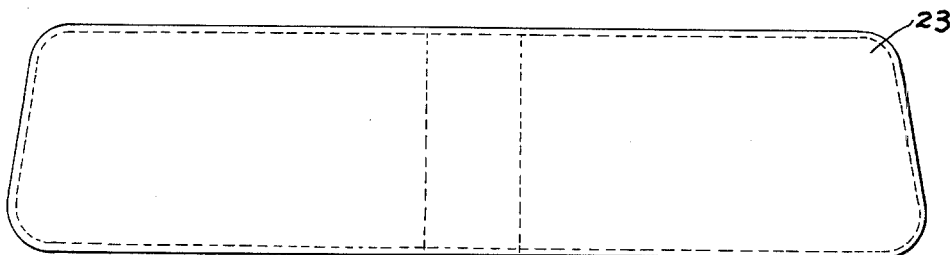
FIG. 3 is a rear elevation of the head rest assembly prior to its being installed on the seat.
Figure 4:
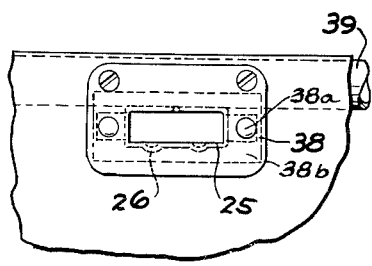
FIG. 4 is a fragmentary plan view of the seat shown in FIGS. 1 and 2 with the head rest removed.
Figure 5:
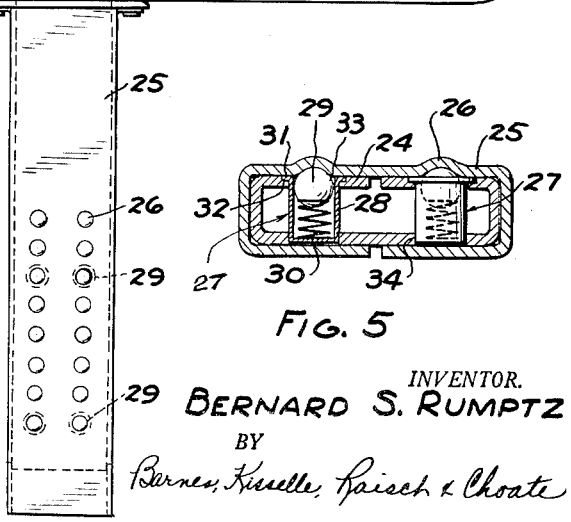
FIG. 5 is a sectional view taken along the line 5—5 in FIG. 7.

Referring to FIGS. 1 and 2, the vehicle seat 20 comprises a seat cushion 21 and a back cushion 22 extending upwardly from the rear of the seat cushion 21. Head rest 23 is mounted on the seat back cushion 22 for movement vertically in order to accommodate persons of various heights. As shown in FIG. 6, the head rest 23 is fixed to the upper end of a post 24 which is telescopically received in a casing 25 fastened in the seat cushion 22 as presently described. Post 24 and casing 25 are tubular and preferably rectangular in cross section (FIG. 5). The rear wall of casing 25 is formed on its inner face with two series or rows of longitudinally spaced and outwardly projecting spherical depressions 26 (FIGS. 3, 5, 6 and 7). Two sets of detent assemblies 27 are arranged on the post 24. The two sets of detent assemblies 27 are relatively widely spaced longitudinally of post 24 and are adapted to selectively engage the depressions 26 to hold the post 24 and head rest 23 in a plurality of vertically adjusted positions.

As is illustrated in FIG. 5, each detent assembly comprises a cylindrical housing 28 enclosing a ball 29 and a spring 30 yieldingly urging the ball 29 outwardly. At one end housing 28 includes an outwardly extending peripheral flange 31 which engages a depression 32 in the rear wall of post 24 and an inwardly extending bead 33 which limits the outward movement of the ball 29 under the action of the spring 30. The other end of housing 28 extends into an opening 34 in the front wall of post 24. When the head rest is in the lowered position (FIG. 3), the balls 29 of both sets of detents engage corresponding sets of depressions 26 in housing 25. When the head rest is in a substantially raised position (FIGS. 6 and 7), only the balls of the lower set of detent assemblies engage with depressions 26. In the latter case the balls of the upper set of detent assemblies are resiliently pressed against the inner face of the rear wall of housing 25.

As shown in FIGS. 1 and 6, post 24 and casing 25 are preferably curved longitudinally so that the head rest 23 moves upwardly and forwardly as the post 24 is moved upwardly and moves downwardly and rearwardly as the post 24 is moved downwardly.

The head rest assembly is designed to be mounted on a previously upholstered seat. The head rest assembly can be thus added to the seat at any time that the vehicle owner wishes. To that end, the lower ends of the side walls 35 of casing 25 formed with slots 36 which are adapted to engage a cross member 37 of the seat. The back cushion or frame assembly of vehicle seats invariably have some sort of horizontally extending tie, stringer or brace which provides the cross member 37. In order to mount the casing 25 on the seat, an opening 0 is made in the outer trim upholstery material C in the upper end of the back cushion 22 and the casing is inserted downwardly through opening 0 to hook the slots 36 over the cross member 37. A plate 38 fixed to tabs 25a on the upper end of the casing 25 by rivets 38a forms a peripheral flange which trims the opening 0 formed in the upholstery C. A gasket 38b is interposed between plate 38 and tabs 25a and snugly engages post 24. Gasket 38b is made of a material such as nylon or polyethylene and acts as a silencer and anti-rattle device. Plate 38 overlaps the top rail 39 of the seat frame and screws 40 pass through openings in the plate into threaded engagement with the openings in the rail 39. Top rail 39 is illustrated in tubular form. The particular seat back form and shape of top rail 39 will vary with different seats but all conventional vehicle seats incorporate a rigid top support member which can be considered equivalent to top rail 39.

It can thus be seen that the head rest assembly may be applied easily to a seat cushion which has been upholstered without tearing or removing any of the upholstery. The head rest can be easily adjusted by grasping the head rest and moving it upwardly or downwardly to the desired vertical position. The tension of springs 30 is sufficient to retain the head rest in any position of vertical adjustment but at the same time permit the head rest to be shifted vertically with relatively little effort. In the event that it is desired not to use the head rest, it may be withdrawn from the casing and the casing 25 may be left in position. Since the plate 38 is flush with the upper end of the seat cushion, the overall appearance of the seat cushion is not adversely affected by removal of the head rest.

A modified form of the invention is shown in FIGS. 8, 9 and 10 wherein the head rest 41 is fixed on the upper end of a straight tubular post 42 of rectangular cross section which is telescopically received in a straight tubular casing 43 of rectangular cross section. Casing 43 is formed with a single series of spherical depressions 44 on the inner face of the rear wall thereof which are engaged by the balls 29 of the longitudinally spaced detent assemblies 27 mounted in the post 42. The lower ends of the casing side walls are formed with slots 45 which are hooked over cross member 37 of the seat as in the previous form of the invention. Likewise, a plate 46 on the upper end of casing 43 is fastened to the top rail 39 of the seat frame by screws 47.

The form of the invention shown in FIGS. 8–10 differs from that of the previous form described primarily in two respects. In the form illustrated in FIGS. 8–10, post 42 has only a single row of indentations and only two detent assemblies and the post 42 and casing 43 are straight rather than curved. This form of the invention is adapted for lighter weight and less expensive construction than the form illustrated in FIGS. 1–7.

A further modified form of the invention is shown in FIGS. 11, 12 and 13 wherein head rest 51 is fixed on the upper end of a straight tubular post 52 of rectangular cross section which is telescopically received in a straight tubular casing 53 of rectangular cross section. A spring detent 54 which is generally U-shaped and has outwardly extending projections 55 formed in the legs thereof is provided in the lower end of post 52 with projections 55 extending through openings 56 in the side walls of the post 52. Casing 53 is formed with a plurality of longitudinally spaced openings 57 along the sides thereof which are engaged by the projections 55 on the detent 54. The lower ends of the side walls of casing 53 are formed with slots 58 which are hooked over the cross member of the seat as in the previous forms of the invention. Likewise, a plate 59 on the upper end of the casing 53 is adapted to be fastened to the top rail of the seat by screws as in the previous forms of the invention.

The form of the invention shown in FIGS. 11, 12 and 13 differs from the previous forms described in the detent assembly that is used. This form is adapted for light weight and less expensive construction than the forms illustrated in FIGS. 1–10.

A further modified form of spring detent assembly is shown in FIG. 14 wherein post 62 is of rectangular cross section and is telescopically received in a tubular casing 63 of rectangular cross section. In this form, the spring detent 64 is in the form of the U but is formed with a projection 65 in only one leg thereof which normally extends through an opening 66 in a side wall of the post 62 and engages one of a plurality of longitudinally spaced openings 67 in one side wall of casing 63. This form of the invention is of even less expensive construction than the form shown in FIGS. 11–13.

A further modified form of detent assembly is shown in FIG. 15 wherein post 72 is of rectangular cross section and is telescopically received in a tubular casing 73 of rectangular cross section. In this form, spring detent 74 is in the form of a U and is formed with a projection 75 in one leg which extends through an opening 76 in a side wall of post 72 and slidably engages a side wall of casing 73 to prevent rattling between post 72 and casing 73. One or more detents 27 at longitudinally spaced points on post 72 selectively engage depressions 77 in the rear wall of casing 73.

I claim:

1. A head rest assembly comprising a post, a head rest mounted on the upper end of said post, a tubular casing for telescopically receiving said post, said casing being formed with a plurality of longitudinally spaced depressions arranged in a row and extending outwardly of said casing, and a plurality of detent means mounted at longitudinally spaced points on said post for selectively engaging said depressions, the lower end of said casing having portions thereof formed into slots for engaging a cross member in a seat frame, and means mounted adjacent the upper end of said casing for fastening the upper end of said casing to a seat frame whereby said head rest assembly can be assembled in a seat by moving the casing downwardly through an opening in the upper end of the seat back, bringing the slots on the lower end of the casing into engagement with the cross member in the seat frame and fastening the means on the upper end of the casing to the seat frame.

2. The combination set forth in claim 1 wherein each said detent means comprises a housing mounted in said post, a ball in said housing, a spring interposed between said ball and said housing, said housing having means for limiting the outward movement of said ball relative to said housing.

3. The combination set forth in claim 1 wherein said post and said casing are curved longitudinally whereby the head rest moved upwardly and forwardly as the post is moved upwardly relative to the casing and moved downwardly and rearwardly as the post is moved downwardly to said casing.

4. The combination set forth in claim 1 including a second row of depressions at longitudinally spaced points along said casing, and a plurality of detents at longitudinally spaced points on said post for selectively engaging said latter depressions, said first and second rows of depressions being spaced apart transversely relative to the longitudinal axis of the casing.

5. The combination set forth in claim 1 wherein said casing and said post are rectangular in cross section, the greatest cross sectional dimension being in the surface thereof containing said depressions and said detent means.

6. A head rest assembly comprising a post, a head rest mounted on the upper end of said post, a casing telescopically receiving said post, said casing being provided with a plurality of longitudinally spaced openings in one side wall thereof, and a spring detent mounted in said post, said detent comprising a U-shaped spring element having a projection extending outwardly from one leg of the element, said post being tubular and having an opening in a side wall thereof through which said projection extends, said projection selectively engaging one of said openings in said casing, said projection being retractable out of engagement with said openings by relative axial movement of the post and casing.

7. The combination set forth in claim 6 including means adjacent the lower end of said casing for engaging the cross member in a seat back and means adjacent the upper end of said casing for fastening the upper end of said casing to a seat frame so that said head rest assembly can be mounted in a back cushion by moving the casing downwardly through an opening in the top of the back cushion and bringing said hook providing means into engagement with a cross member in the back cushion, the means adjacent the upper end of the casing engaging the upper end of the seat frame.

8. A head rest assembly comprising a tubular post, a head rest mounted on the upper end of said post, a tubular casing for telescopically receiving said post, said casing being formed with a plurality of longitudinally spaced openings arranged in a row along one side wall thereof, and a spring detent member mounted within said post and having a projection in one leg thereof, said tubular post having an opening through which said projection extends, the legs of said spring detent engaging the side walls of said post, said projection selectively engaging one of said openings in said casing, the lower end of said casing having portions thereof formed into slots for engaging the cross member in a seat frame, and means mounted adjacent the upper end of said casing for fastening the upper end of said casing to a seat frame whereby said head rest assembly can be assembled in a seat by moving the casing downwardly through an opening in the upper end of the seat back, bringing the slots on the lower end of the casing into engagement with the cross member in the seat frame and fastening the means on the upper end of the casing to the seat frame.

9. The combination set forth in claim 8 wherein said casing and said post are rectangular in cross section, the least cross sectional dimension being in the surface thereof containing said openings.

10. A head rest assembly comprising a post, a head rest mounted on the upper end of said post, a tubular casing for telescopically receiving said post, said casing being formed with a plurality of longitudinally spaced depressions arranged in a row and extending outwardly of said casing, detent means mounted on said post for selectively engaging said depressions, a spring detent mounted in said post, said detent comprising a U-shaped spring element having a projection extending outwardly from one leg of the element, said post having an opening in a side wall thereof through which said projection extends into sliding engagement with a side wall of said casing, the lower end of said casing having portions thereof formed into slots for engaging a cross member in a seat frame, and means mounted adjacent the upper end of said casing for fastening the upper end of said casing to a seat frame whereby said head rest assembly can be assembled in a seat by moving the casing downwardly through an opening in the upper end of the seat back, bringing the slots on the lower end of the casing into engagement with the cross member in the seat frame and fastening the means on the upper end of the casing to the seat frame.

11. The combination set forth in claim 10 wherein the plane of said U-shaped spring element lies substantially at right angles to the direction of movement of said detent means.

12. In a vehicle seat, the combination comprising an upholstered back cushion and a frame assembly, a head rest, a post on which said head rest is mounted, and a casing for telescopically receiving said post, interengaging means between said post and said casing for adjusting the position of said post longitudinally of said casing, said back cushion and frame assembly having a substantially vertical opening therein in the upper end thereof, interengaging means between said casing and said back cushion and frame assembly adapted to interengage said casing when the casing is moved downwardly through the opening in the back cushion and frame assembly and adapted to be disengaged when the casing is moved upwardly through the opening in the back cushion and frame assembly for removal of the casing, and means on said casing adjacent the upper end thereof engaging a portion of said back cushion and frame assembly to hold said casing in position in said back cushion.

13. In a vehicle seat, the combination comprising an upholstered back cushion and a frame assembly, a head rest, a post on which said head rest is mounted, and a casing for telescopically receiving said post, interengaging means between said post and said casing for automatically holding the position of said post longitudinally of said casing, said back cushion and frame assembly having a substantially vertical opening therein in the upper end thereof, interengaging means between said casing and said back cushion and frame assembly adapted to interengage said casing when the casing is moved downwardly through the opening in the back cushion and frame assembly and adapted to be disengaged when the casing is moved upwardly through the opening in the back cushion and frame assembly for removal of the casing, and means on said casing adjacent the upper end thereof engaging a portion of said back cushion and frame assembly to hold said casing in position in said back cushion.

14. The combination set forth in claim 12 wherein said last-mentioned means includes a gasket surrounding said post and extending inwardly into contact with said post.

15. The combination set forth in claim 14 wherein said gasket is made of plastic material.

16. The combination set forth in claim 13 wherein said last-mentioned means comprises an integral peripheral flange at the upper end of said casing adapted to engage said portion of said back cushion and frame assembly and a gasket of plastic material interposed between said flange and said portion of said back cushion and frame assembly, said gasket extending inwardly into contact with said post.

References Cited in the file of this patent

UNITED STATES PATENTS

| | | |
|---|---|---|
| 1,346,341 | Schinkez | July 13, 1920 |
| 1,646,049 | Boye | Oct. 18, 1927 |
| 1,763,294 | Emmert | June 10, 1930 |
| 1,867,600 | Schwarzkopf | July 19, 1932 |
| 2,243,190 | Capaldo | May 27, 1941 |
| 2,490,088 | Penn | Dec. 6, 1949 |